(12) United States Patent
Zhu et al.

(10) Patent No.: US 8,045,348 B2
(45) Date of Patent: Oct. 25, 2011

(54) SWITCHING MODE POWER SUPPLY CONTROLLER WITH HIGH VOLTAGE STARTUP CIRCUITS

(75) Inventors: Yajiang Zhu, Shanghai (CN); Zheng Ying, Shanghai (CN); Xianfeng Liu, Shanghai (CN); Yanping Wang, Shanghai (CN)

(73) Assignee: BCD Semiconductor Manufacturing Limited (KY)

( * ) Notice: Subject to any disclaimer, the term of this patent is extended or adjusted under 35 U.S.C. 154(b) by 209 days.

(21) Appl. No.: 12/421,461

(22) Filed: Apr. 9, 2009

(65) Prior Publication Data

US 2010/0259952 A1    Oct. 14, 2010

(51) Int. Cl.
*H02M 1/00* (2007.01)

(52) U.S. Cl. ............ 363/49; 363/18; 363/20; 363/21.12; 363/56.09

(58) Field of Classification Search ............. 363/16, 363/17, 18, 19, 20, 21.01, 21.03, 21.04, 21.07, 363/21.08, 21.12, 21.15, 21.16, 49, 56.09
See application file for complete search history.

(56) References Cited

U.S. PATENT DOCUMENTS

| | | | |
|---|---|---|---|
| 5,452,195 A | 9/1995 | Lehr et al. | |
| 5,640,317 A | 6/1997 | Lei | |
| 6,404,654 B1 | 6/2002 | Wang | |
| 6,480,401 B2 * | 11/2002 | Tang | 363/21.02 |
| 6,674,271 B2 | 1/2004 | Choo et al. | |
| 6,807,705 B2 | 10/2004 | Miermans | |
| 6,943,535 B1 | 9/2005 | Schiff | |
| 6,980,442 B2 | 12/2005 | Lv et al. | |
| 7,183,616 B2 | 2/2007 | Bhalla et al. | |
| 7,313,004 B1 | 12/2007 | Yang et al. | |
| 7,391,630 B2 | 6/2008 | Acatrinei | |
| 7,417,879 B2 | 8/2008 | Sawtell | |
| 7,876,582 B2 * | 1/2011 | Zheng et al. | 363/21.13 |
| 2001/0004204 A1 | 6/2001 | Mitsuaki | |
| 2001/0035554 A1 * | 11/2001 | Yamauchi et al. | 257/340 |
| 2002/0151148 A1 * | 10/2002 | Racanelli | 438/385 |
| 2003/0169606 A1 | 9/2003 | Miermans | |
| 2003/0183924 A1 | 10/2003 | Bhalla et al. | |
| 2005/0169019 A1 * | 8/2005 | Konno | 363/49 |
| 2005/0212501 A1 | 9/2005 | Acatrinei | |
| 2007/0210772 A1 | 9/2007 | Sawtell | |
| 2008/0239766 A1 * | 10/2008 | Trattler | 363/21.05 |

(Continued)

OTHER PUBLICATIONS

U.S. Appl. No. 12/136,760, Jun. 10, 2008, Zhu et al.

(Continued)

*Primary Examiner* — Adolf Berhane
*Assistant Examiner* — Nguyen Tran
(74) *Attorney, Agent, or Firm* — Kilpatrick Townsend & Stockton LLP (57) ABSTRACT

A controller for a switching mode power supply includes two semiconductor chips. The first semiconductor chip has a high-voltage startup transistor coupled to a high voltage supply input terminal and configured to provide a charging current in a startup phase or protection mode of a switching mode power supply (SMPS) and to provide substantially no current in a normal operation phase of the SMPS. The second semiconductor chip has a control circuit for controlling the switching mode power supply. The second semiconductor chip also has first and second on-chip high-voltage resistors coupled to the high-voltage supply input terminal and the high-voltage startup transistor in the first semiconductor chip. The first and the second on-chip high-voltage resistors are configured to provide a voltage and a current related to a voltage at the high-voltage supply input terminal.

31 Claims, 9 Drawing Sheets

U.S. PATENT DOCUMENTS

2008/0310191 A1  12/2008  Zhu et al.
2009/0279333 A1* 11/2009  Zhu et al. ................. 363/124

OTHER PUBLICATIONS

U.S. Appl. No. 12/248,665, Oct. 9, 2008, Zhu et al.

Chen et al., "*Reduction of Power Supply EMI Emission by Switching Frequency Modulation*," IEEE Power Electronics and Drive System Conference 1993; pp. 127-133.

Stankovich et al., "*Analysis and Synthesis of Randomized Modulation Schemes for Power Converters*," IEEE Transactions of Power Electronics, vol. 10, No. 6, Nov. 1995, pp. 680-693.

Kassakian et al., "Principles of Power Electronics;" Form and Function: An Overview, Chapter 2, Section 2.2, Jun. 1992, pp. 11-13.

Non-Final Office Action for U.S. Appl. No. 12/248,665, mailed on Aug. 19, 2011, 13 pages.

Non-Final Office Action for U.S. Appl. No. 12/136,760, mailed on Aug. 4, 2011, 24 pages.

* cited by examiner

SWITCHING MODE POWER SUPPLY CONTROLLER WITH HIGH VOLTAGE STARTUP CIRCUITS

CROSS-REFERENCES TO RELATED APPLICATIONS

This application is related to commonly assigned U.S. patent application Ser. No. 12/248,665 entitled "METHOD AND APPARATUS FOR REDUCING STANDBY POWER OF SWITCHING MODE POWER SUPPLIES" filed Oct. 9, 2008 by YAJIANG ZHU et al. and U.S. patent application Ser. No. 12/136, 760 entitled "METHOD AND SYSTEM FOR PULSE FREQUENCY MODULATED SWITCHING MODE POWER SUPPLIES" filed Jun. 10, 2008 by YAJIANG ZHU et al.

BACKGROUND OF THE INVENTION

The present invention relates to switching mode power supplies (SMPS), and more particularly to the switching mode power supplies with low cost, low standby power, and versatile protection features.

Regulated power supplies are indispensable in modern electronics. For example, desktop and laptop computers often need to receive unregulated power input from various outlets and provide regulated power supplies on the motherboard to the CPU, memories, and periphery circuitry. Regulated power supplies are also used in a wide variety of consumer applications, such as home appliances, automobiles, and portable chargers for mobile electronic devices, etc.

In general, a power supply can be regulated using a linear regulator or a switching mode controller. A linear regulator maintains the desired output voltage by dissipating excess power. In contrast, a switching mode controller rapidly switches a power transistor on and off with a variable duty cycle or variable frequency and provides an average output that provide the desired output voltage. Switching mode power supplies (SMPS) have the advantages of smaller size, higher efficiency and larger output power capability, and are widely utilized in mobile phone chargers, notebook computer adapters, and other fields. In recent years, green power supplies are emphasized, which require higher conversion efficiency and especially lower standby power consumption.

Pulse Width Modulation (PWM) and Pulse Frequency Modulation (PFM) are two control architectures of switching mode power supplies. In PWM control circuits, the duty cycle of the control pulse is used to control the output of the power supply. In a PFM controlled switching mode power supply, the switching frequency can be controlled in response to load conditions.

Figure 1:
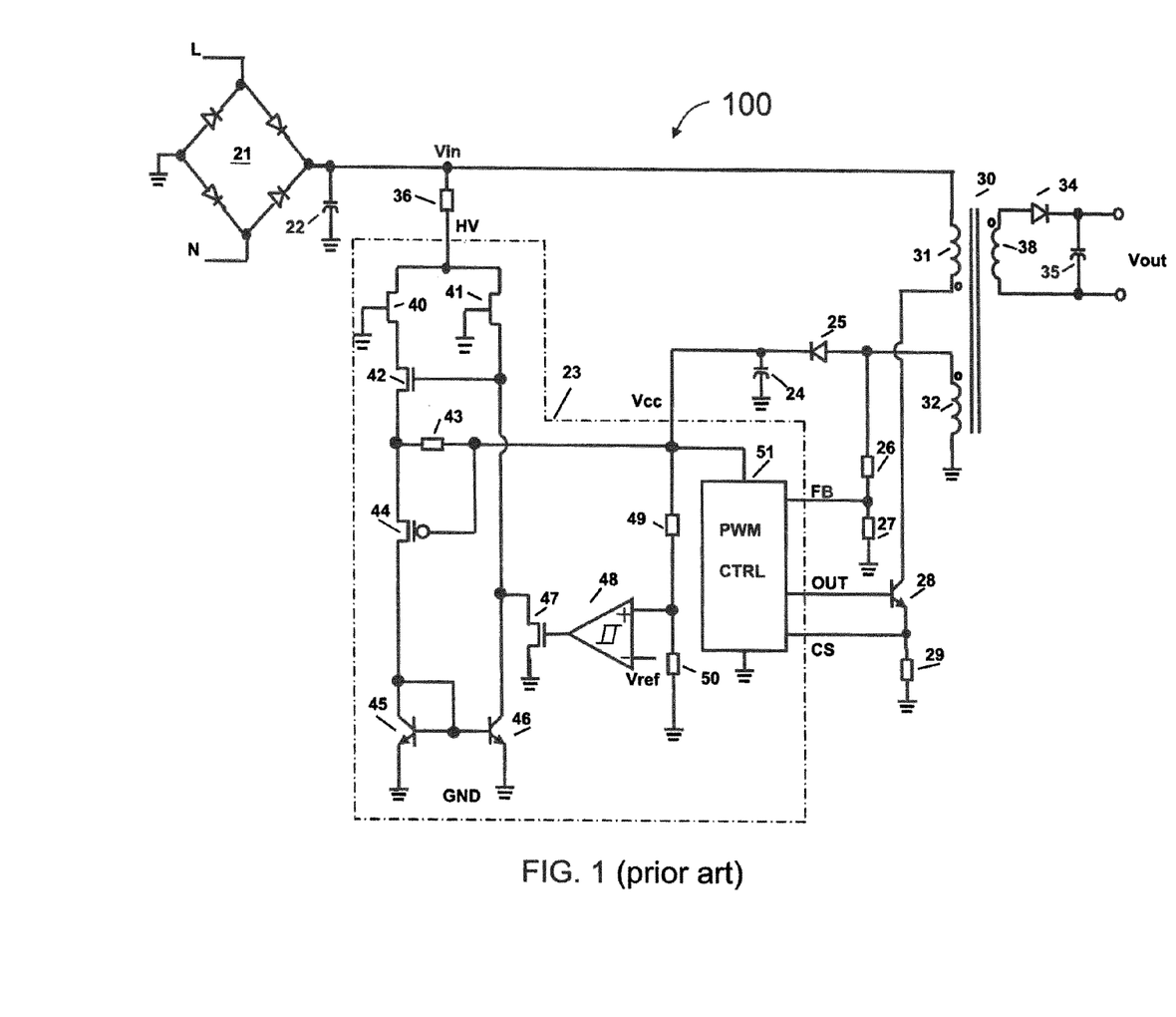
FIG. 1 is a schematic diagram of a conventional switching mode power supply that includes a single chip controller with on-chip high voltage startup circuits.

FIG. 1 illustrates a conventional switching mode power supply (SMPS) 100 which includes a full-wave bridge rectifier 21, a transformer 30 with a primary winding 31, a secondary winding 38, and an auxiliary winding 32. SMPS 100 also has a controller 23, filter capacitors 22, 24, and 35, and rectifying diodes 25 and 34. When the system is in normal operation mode, the operating power of controller 23 is provided by auxiliary winding 32, diode 25, and capacitor 24. But at system startup, no energy will be delivered from auxiliary winding 32 because controller 23 will not provide switching signals to power transistor 28. So in the startup phase, capacitor 24 can only be charged by the startup circuits of controller 23.

The startup circuits in controller 23 includes high voltage startup transistors 40 and 41, a switch 42, a startup current limit resistor 43, and startup current limit transistors 44, 45, and 46. Controller 23 also has an under voltage lock out circuit including a comparator 48, a switch 47, and voltage divider resistors 49 and 50, as well as switching mode power supply control unit 51 (PWM CTRL). When Vcc rises above a threshold voltage, comparator 48 operates to maintain switch 42 off, which will cut off the startup current during system normal operation. Control unit 51 regulates output voltage Vout in response to a voltage feedback signal from the FB pin through voltage divider resistors 26 and 27 and a current sense signal from the CS pin through the voltage drop across resistor 29.

Depending on the application, on-chip high voltage start up transistors 40 and 41 may require junction breakdown voltages higher than 500V. The on-chip implementation of high voltage startup transistors 40 and 41 can be expensive because the integration of high voltage active devices with the low voltage control circuits requires expensive substrate or epitaxial semiconductor materials and several extra photolithography steps. Moreover, the high voltage (HV) pin associated with the high voltage transistors can be vulnerable to electrical static discharge (ESD) due to the limited size of the on-chip high voltage transistors.

From the above, it is seen that even though conventional switching mode power supplies (SMPS) are widely used, they suffer from many limitations. Therefore, improved switching mode control circuits and power supplies are desired.

BRIEF SUMMARY OF THE INVENTION

Embodiments of the present invention provide techniques for switching mode controllers and power supplies. Embodiments can be implemented with one or more of low cost, low standby power, and versatile protection features. In an embodiment, the present invention provides a switch mode power supply controller with a high voltage startup chip including a low-cost high-voltage transistor and a low-cost control chip with high-voltage resistors and no high-voltage transistors.

In an embodiment, the on-chip high voltage resistors and control circuits are used to provide base current for the high voltage startup transistor chip in the startup phase and protection mode, and to cutoff startup current during normal operation of the switching mode power supply. In another embodiment, the present invention provides methods and circuits to sense line voltage variations by taking advantage of the on-chip high voltage resistors and control circuits for SMPS protections and compensations.

According to an embodiment of the present invention, a controller for a switching mode power supply includes two semiconductor chips. The first semiconductor chip has a high-voltage startup transistor coupled to a high-voltage supply input terminal and configured to provide a charging current in a startup phase or protection mode of a switching mode power supply (SMPS) and to provide substantially no current in a normal operation phase of the SMPS. The second semiconductor chip has a control circuit for controlling the switching mode power supply. The second semiconductor chip also has first and second on-chip high-voltage resistors coupled to the high-voltage supply input terminal and the high-voltage startup transistor in the first semiconductor chip. The first and the second on-chip high-voltage resistors are configured to provide a voltage and a current related to a voltage at the high-voltage supply input terminal.

In a specific embodiment, the control circuit is configured to provide a pulse width modulated (PWM) control signal to control the switching mode power supply. In another embodiment, the control circuit is configured to provide a pulse frequency modulated (PFM) to control the switching mode power supply.

In an embodiment of the above controller, the second semiconductor chip also has a high-voltage terminal for coupling to an input voltage, a feedback terminal coupled to an auxiliary winding of the SMPS for sensing the output voltage, and an input power supply terminal for coupling to the auxiliary winding of the SMPS for receiving operating power supply. The control circuit is coupled to the feedback terminal and an off-chip power transistor.

In an embodiment of the above controller, a current through the on-chip high-voltage resistors is used for sensing the high-voltage supply input. In an embodiment, a voltage at a node between the first and the second on-chip high-voltage resistors are used for sensing the high-voltage supply input. In a specific embodiment, the on-chip high-voltage resistors reside over a dedicated thick field oxide so as to avoid breakdown of an insulator between the high voltage resistors and a substrate of the second semiconductor chip. In another embodiment, a doped well is provided beneath the dedicated thick field oxide to attenuate noise injection into the substrate from the high voltage resistors. In an embodiment, each of the on-chip high-voltage resistors is shaped in a spiral surrounding a high voltage pad for reducing voltage gradients along the resistors.

In another embodiment of the controller, the high-voltage startup transistor includes a bipolar transistor having a collector, a base, and an emitter, in which the collector is coupled to a rectified line voltage, the emitter is coupled to a power supply pin Vcc of the SMPS controller, and the base is coupled to the collector through one or more high voltage resistors on the control chip. The base is also coupled to a ground potential through a startup control circuit of the control chip. In an embodiment, a current through the on-chip high-voltage resistors is configured to flow into the base of the high voltage startup transistor for providing power to the controller in a startup phase or protection mode of the SMPS.

In another embodiment of the controller, the startup control circuit includes a biasing device connected in series with a switch and a current mirror. The biasing device is configured to maintain the startup transistor in an off state when the switch is in on state, and the current mirror is configured to sense the current through the high voltage resistors. In an embodiment, the switch comprises an NMOS transistor having a gate configured to receive the signal from an under voltage lockout comparator and the protection mode signal of the SMPS controller. The biasing device has a source-follower-connected PMOS transistor that has a source connected to one terminal of the on-chip high voltage resistors and the base of the high voltage startup transistor. The biasing device further includes one or more diode-connected PMOS transistors in series with a current source coupled between the Vcc and the ground potential, a gate of the source-follower-connected PMOS transistor being coupled to the diode-connected PMOS transistors such that the base voltage of the high voltage startup transistor is less than or equal to the emitter voltage of the high voltage startup transistor when the system is in normal operation mode. In an embodiment, the switch is configured to receive an under voltage lockout control signal and a protection mode control signal of the SMPS controller, the switch is turned off when the SMPS is in startup phase or protection mode, whereas the switch is turned on when the SMPS is in normal operation mode. In a specific embodiment, the first semiconductor chip and the second semiconductor chip are included in a single dual-chip package.

In another embodiment, the invention provides a switching mode power supply for receiving an input voltage and providing a DC output voltage. The power supply includes a transformer coupled to the input voltage and having a primary winding, a secondary winding, and one or more auxiliary windings. The power supply also includes a switching mode power supply (SMPS) controller having a feedback terminal for sensing the output voltage and an input power supply terminal for coupling to an auxiliary winding of the transformer. The SMPS controller includes two semiconductor chips. The first semiconductor chip has a high-voltage startup transistor configured to provide a charging current in a startup phase or protection mode of the SMPS and to provide substantially no current in a normal operation phase of the SMPS. The second semiconductor chip has a high-voltage terminal for coupling to the input voltage, a feedback terminal coupled to an auxiliary winding for sensing the output voltage, and an input power supply terminal for coupling to an auxiliary winding of the transformer for receiving operating power supply. The second semiconductor chip also has first and second on-chip high-voltage resistors coupled in series to the input voltage and to the high-voltage startup transistor and a control circuit coupled to the feedback terminal and an off-chip power transistor. A node between the first and the second high-voltage resistors is used for sensing the input voltage.

In an embodiment of the above power supply, the first and the second on-chip high-voltage resistors are configured to provide a voltage and a current for sensing the high-voltage supply input. In another embodiment, the on-chip high-voltage resistors reside over a dedicated thick field oxide so as to avoid breakdown of the insulator between the high voltage resistors and a substrate of the second integrated circuit chip. In an embodiment, the first semiconductor chip and the second semiconductor chip are included in a single dual-chip package.

According to another embodiment of the invention, a switching mode power supply (SMPS) controller has a high-voltage terminal for coupling to an input voltage, a feedback terminal coupled to an auxiliary winding for sensing the output voltage, and an input power supply terminal for coupling to an auxiliary winding of the transformer for receiving operating power supply. The controller also has a first and a second on-chip high-voltage resistors coupled in series to the input voltage, in which a node between the first and the second high-voltage resistors is configured for sensing the input voltage. A low-voltage transistor is coupled to the second high-voltage resistor and the input power supply terminal for providing startup power to the SMPS controller.

In an embodiment of the controller, the first and the second on-chip high-voltage resistors is used to provide a voltage and a current for sensing the high-voltage supply input. In another embodiment, the on-chip high-voltage resistors reside over a dedicated thick field oxide so as to avoid breakdown of the insulator between the high voltage resistors and a substrate of the second integrated circuit chip. In another embodiment, the first semiconductor chip and the second semiconductor chip are included in a single dual-chip package.

According to yet another embodiment, the invention provides a switching mode power supply for receiving an input voltage and providing a DC output voltage. The power supply includes a transformer coupled to the input voltage and having a primary winding, a secondary winding, and one or more auxiliary windings. The power supply also has a switching-mode power supply (SMPS) controller having a feedback terminal for sensing the output voltage and an input power supply terminal for coupling to an auxiliary winding of the transformer. The SMPS controller has first and second on-chip high-voltage resistors coupled in series to the input voltage. A low-voltage transistor is coupled to the second high-voltage resistor and the input power supply terminal for providing startup power to the SMPS controller. In the power supply, a node between the first and the second high-voltage resistors is adapted for sensing the input voltage.

In an embodiment of the power supply, the first and the second on-chip high-voltage resistors are configured to provide a voltage and a current for sensing the high-voltage supply input. In another embodiment, the on-chip high-voltage resistors reside over a dedicated thick field oxide so as to avoid breakdown of the insulator between the high voltage resistors and a substrate of the second integrated circuit chip. In another embodiment, the first semiconductor chip and the second semiconductor chip are included in a single dual-chip package Many benefits can be achieved by way of embodiments of the present invention over conventional techniques. For example, in an embodiment of the present invention, a switching mode power supply controller with high voltage startup circuits is implemented by a dual-chip single package of a low-cost high voltage startup transistor chip and a low-cost control chip with on-chip high voltage resistors. The fabrication cost of the control chip with on-chip high voltage resistors is lower than the single chip controller solution integrated with high voltage transistor circuits due to cheaper substrate material and fewer process steps. In another embodiment, the on-chip high voltage resistors can also be used to sense line voltage variations for switching mode power supply protections and compensations such as brownout, over line voltage protection, and line voltage compensation of maximum input power limit, etc. without the need of extra circuit and pin. In still another embodiment, better ESD performance of the high voltage pin can be achieved because it would be more cost effective to increase the device size of the high voltage startup transistor on a separate chip.

Various additional features and advantages of the present invention can be more fully appreciated with reference to the detailed description and accompanying drawings that follow.

DETAILED DESCRIPTION OF THE INVENTION

The present invention relates to switching mode power supplies (SMPS). Embodiments of the present invention provide cost-effective control circuits for SMPSs. The cost of the SMPS controller and the cost to manufacture a SMPS are major concerns for particular applications such as chargers and adapters. The simpler the semiconductor manufacturing process and the fewer pins of the SMPS controller, the lower the component count of the SMPS, and the lower the total cost of a SMPS.

A SMPS having lower standby power can save energy when the power supply is plugged into the AC socket in idle status. To achieve low standby power without sacrificing startup time, in an embodiment of the invention, a high voltage startup transistor is implemented in a semiconductor chip, separate from control logic, to provide large enough startup current during the startup phase. This startup current is cut off when the SMPS is in normal operation mode.

An embodiment provides safety margin for devices powered by an SMPS by shutting down the output of the SMPS under certain conditions, such as when the input line voltage is too high, or when the input line voltage is too low (brownout), etc. The SMPS enters the protection mode in these cases. When the output of a SMPS is shutdown in protection mode, the SMPS controller can resume normal operation after the fault conditions are removed. In this regard, some embodiments of the invention provide simple ways to provide energy for the SMPS controller in protection mode and to sense line voltage variations without extra pins. Embodiments of the invention provide simple ways to sense line voltage variations without extra pins. This capability allows the output of the SMPS to be shut down when the output of a SMPS is overloaded, and to compensate for variations of maximum input power over line voltage so the maximum input power to the SMPS can be limited accurately.

Figure 2:
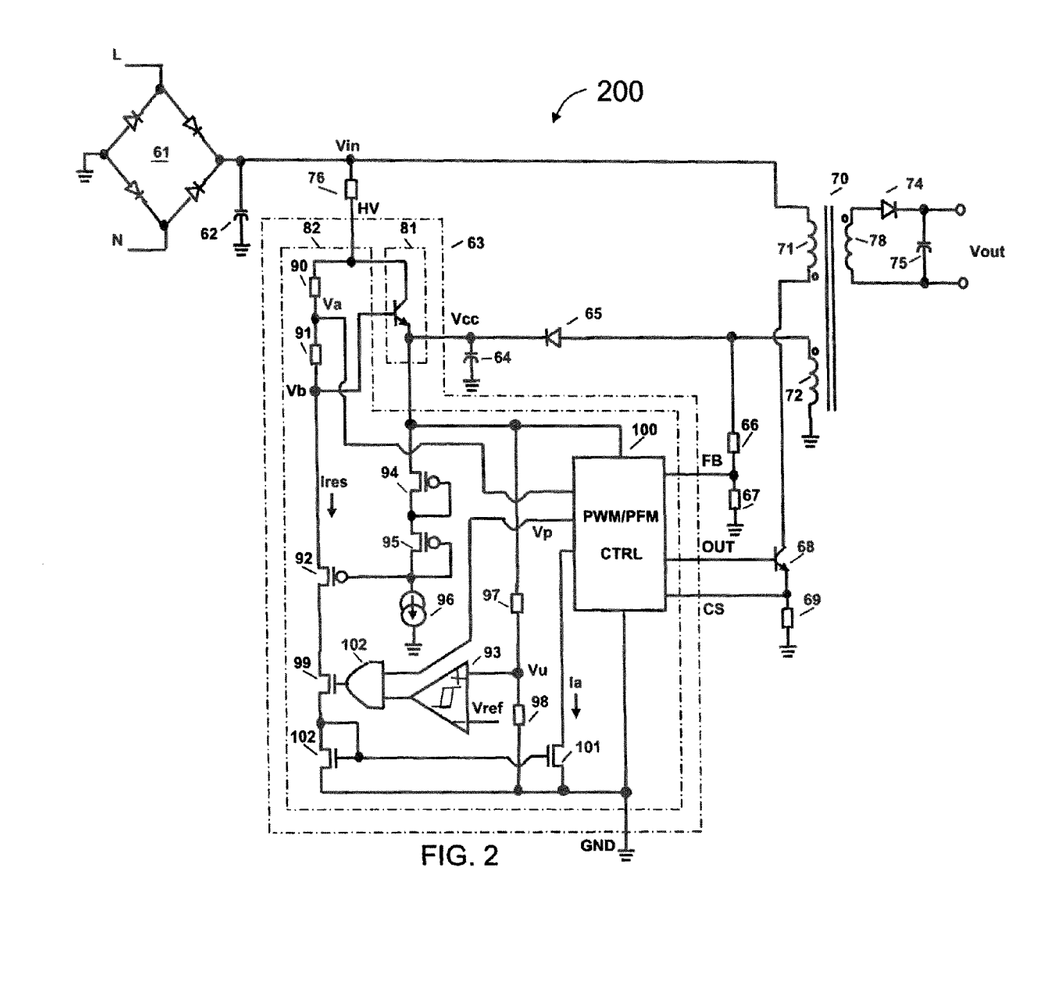
FIG. 2 is a simplified schematic diagram of a switching mode power supply according to an embodiment of the present invention.

FIG. 2 is a simplified schematic diagram of a switching mode power supply (SMPS) 200 according to an embodiment of the present invention. Power supply 200 has a full-wave bridge rectifier 61 that provides a line voltage Vin. Power supply 200 also has a transformer 70 with a primary winding 71, a secondary winding 78, and at least one auxiliary winding 72. Power supply 200 also has a SMPS controller 63, a power transistor 68, current sense resistor 69, filter capacitors 62, 64, and 75, and rectifying diodes 65 and 74. A pair of resistors 66 and 67 form a voltage divider coupled to the voltage feedback signal FB. At this high level, the elements outside the SMPS controller of SMPS 200 resemble corresponding elements in SMPS 100 of FIG. 1.

In an embodiment, controller 63 includes two semiconductor chips:

a high voltage semiconductor chip 80 having a high voltage bipolar transistor 81, and a control chip 82, which includes control circuitry.

In some embodiments, high voltage chip 81 and control chip 82 are included in a single dual-chip package, as shown in FIG. 2. Operations of controller 63 are discussed below with reference to the following pinout arrangement of the dual-chip package:

Pin FB for receiving a feedback signal from the output of power supply;

Pin CS for sensing a current in the primary winding of the transformer;

Pin GND for connection to the ground;

Pin OUT for outputting control pulse signals for controlling the power supply;

Pin Vcc for providing operating power to the SMPS controller; and

Pin HV for connection to an external power input, such as a rectified line voltage.

Of course, other packaging method can also be used.

In an embodiment, the operating power of controller 63 in normal operation mode is provided from auxiliary winding 72 through a diode 65 and a capacitor 64. In startup phase and in protection mode, the operating power is provided by startup transistor 81, which charges capacitor 64. Transistor 81 has a collector, a base, and an emitter. The collector is connected to rectified line voltage Vin through external resistor 76 outside SMPS controller 63. The emitter is connected to power supply pin Vcc of SMPS controller 63. The base is coupled to the line voltage Vin through one or more high voltage resistors, e.g., 90 and 91, on the control chip 82. The base of transistor 81 is also coupled to a ground potential GND through a startup control circuit of control chip 82. As described below, high voltage startup transistor 81 is turned on during the start up phase and in the protection mode to provide power to SMPS controller 63, but is turned off during normal operation mode to reduce stand by current.

In the embodiment shown in FIG. 2, control chip 82 includes PWM/PFM control unit 100, startup control circuits 92~102, and on-chip high voltage resistors 90 and 91. In an embodiment, control unit 100 monitors primary side current signal from the CS pin and output voltage signal from the FB pin and regulates the output of the power supply. The regulation is performed by issuing ON/OFF pulse control signal OUT to power transistor 68 which controls the current flow in primary winding 71 of transformer 70. Depending on the embodiment, PWM/PFM power control unit 100 can provide pulse width modulated (PWM) or pulse frequency modulated (PFM) control pulse signals. Further details of a PWM control unit and PWM-controlled power supply can be found, for example, in commonly assigned U.S. patent application Ser. No. 12/248,665 entitled "METHOD AND APPARATUS FOR REDUCING STANDBY POWER OF SWITCHING MODE POWER SUPPLIES" filed Oct. 9, 2008. Similarly, further details of a PFM control unit and PFM-controlled power supply can be found, for example, in commonly assigned U.S. patent application Ser. No. 12/136, 760 entitled "METHOD AND SYSTEM FOR PULSE FREQUENCY MODULATED SWITCHING MODE POWER SUPPLIES" filed Jun. 10, 2008.

In FIG. 2, startup control circuit has a biasing device composed of 92, 94, 95 and 96, which is connected in series with a transistor 99. In some embodiments, transistor 99 is turned on when the system is in normal operation mode and turned off when the system is in start up mode or protection mode. The conditions that cause transistor 99 to be turned on and off are discussed in a later section.

When transistor 99 is turned off, the transistor 92 in biasing device is also turned off. High voltage transistor 81 is turned on, because base terminal Vb of high voltage transistor 81 now receives a current from high voltage input pin (HV) through resistors 90 and 91. As a result, a current from the emitter of high voltage transistor 81 charges up capacitor 64 and provides operating power to control circuit 63 during the start up phase and in protection mode.

When transistor 99 is turned on, the system is in normal operation mode. Under this condition, the base voltage at Vb of transistor 81 is lower than its emitter voltage. As a result, transistor 81 is turned off. This bias condition is accomplished with biasing device composed of 92, 94, 95 and 96. In an embodiment, biasing device includes source-follower-connected PMOS transistor 92, i.e., when transistor 92 is on, its source voltage is higher than its gate voltage by a threshold voltage |Vtp|. PMOS transistor 92 has a source connected to one terminal Vb of on-chip high voltage resistor 91 and the base Vb of high voltage startup transistor 81. The gate of PMOS transistor 92 is connected to current source 96 and diode-connected PMOS transistors 94 and 95 connected in series. PMOS transistor 94, in turn, is connected to the emitter of high voltage transistor 81. In this configuration, during normal operation, transistor 99 and PMOS transistor 92 are turned on. The emitter voltage of high voltage transistor 81 is higher than the gate voltage of PMOS transistor 92 by 2*|Vtp| (assuming PMOS transistors 94 and 95 have the same threshold voltage |Vtp| as PMOS transistor 92). As a result, high voltage transistor 81 is turned off during normal operation, when the operating power is provided by the auxiliary winding of the power supply. In this arrangement, standby current is reduced during normal operation, while sufficient start up power can also be provided from the input line voltage in the startup phase.

In embodiments of the invention, SMPS controller 63 can enter the startup mode or protection mode under various conditions. Such conditions can be triggered, for example, by changes in input line voltage Vin, which can be monitored by voltage and current signals provided in controller 63.

In FIG. 2, a pair of transistors 102 and 101 form a current mirror configured to sense changes in line voltage Vin through a current Ires that flows through high voltage resistor 91. Current Ires flows through transistor 102 and is mirrored through transistor 101 as current Ia, which is used by controller 100 for line voltage compensation in response to variations in input line voltage Vin. For example, a protection mode can be triggered if current Ia is lower than a predetermined reference current.

Variations in input line voltage Vin can also be monitored using voltage signal Va, which is the voltage between the on-chip high voltage resistors 90 and 91 and represents a fraction of line voltage Vin. In an embodiment, PWM/PFM control unit 100 generates a protection mode signal Vp based, at least in part, on information provided by Va. For example, it may be desirable to set the system in the protection mode when the line voltage is too high. In other embodiments, the protection mode may be entered when Vin is low, or when the output of power supply 200 is shorted. In an embodiment, if Vp is low, the SMPS is in protection mode, and the OUT pin remains low to cease the on/off operation of power transistor 68, and transistor 99 is turned off. Under this condition, startup transistor 81 is on to provide operating current of controller 63 in the protection mode. In an embodiment, a high level of Vp, e.g., at 5V, may indicate a normal operation mode. In some embodiments, both parameters, Va and Ia, are used for the controller to respond to variations in line voltage Vin.

In an embodiment, controller 63 also monitors the level of its operating voltage at Vcc, which is sensed by a signal Vu at a node between voltage divider resistors 97 and 98. Signal Vu is coupled to a positive terminal of an under voltage lockout comparator 93. In an embodiment, the under voltage condition is entered when Vu is lower than Vref, a predetermined reference voltage.

In a specific embodiment, transistor 99 is an NMOS transistor receiving a control signal from AND gate 102, which is configured to receive protection mode signal Vp and an output signal from under voltage lockout comparator 93. The output of AND gate 102 causes switch NMOS to be turned on when controller 63 is in normal operation mode and turned off in startup or protection mode.

FIG. 2 depicts a primary side regulated (PSR) system, with PWM/PFM control unit 100 generating the ON/OFF control signal OUT for power transistor 68 in response to primary side current signal from the CS pin and output voltage signal from the FB pin. However, embodiments of the present invention can also be applied to secondary side control systems, in which the feedback signal from the secondary side is provided to the controller with, e.g., an opto-coupler.

Figure 3:
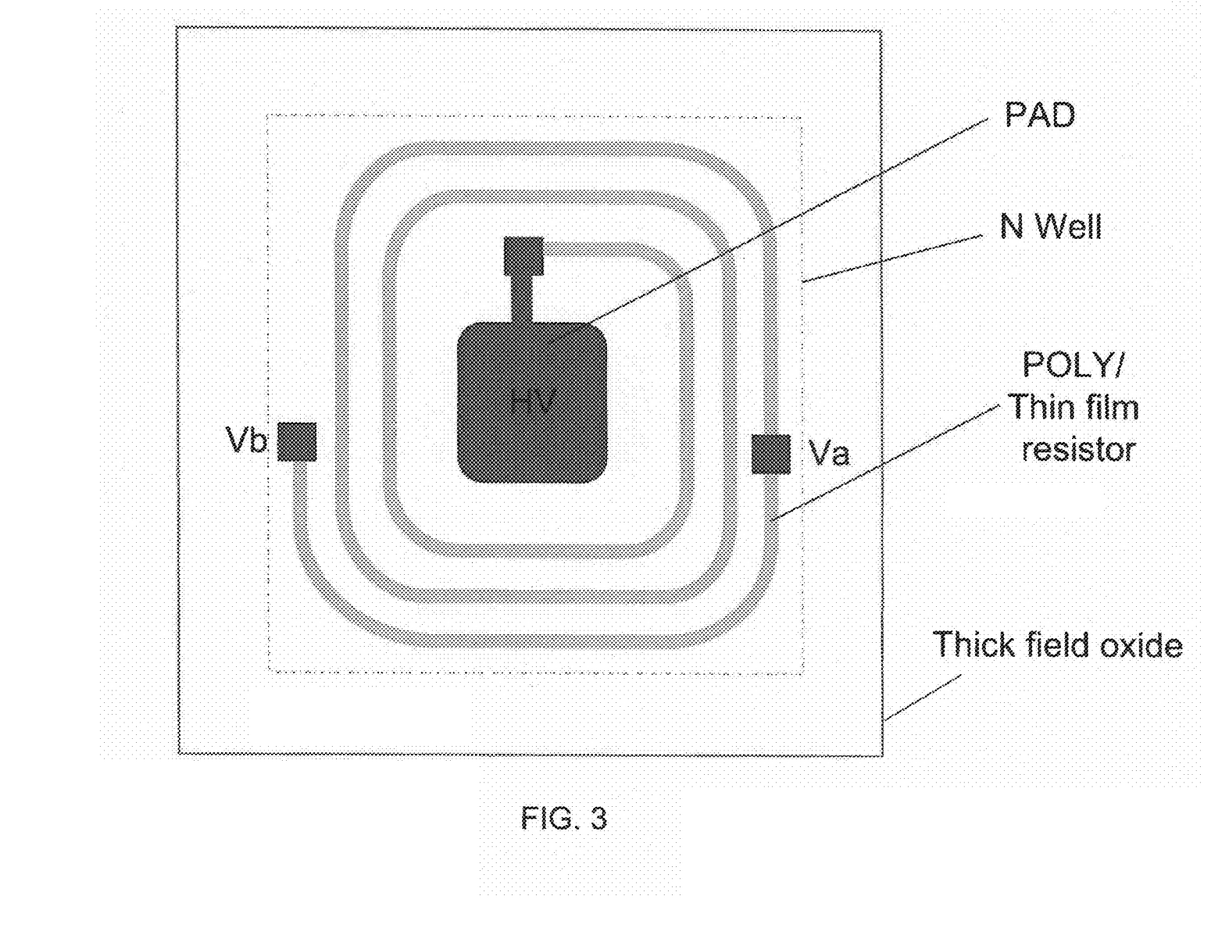
FIG. 3 is a simplified layout diagram of on-chip high voltage resistors according to an embodiment of the present invention.

FIG. 3 is a simplified top view of on-chip high voltage resistor layout according to an embodiment of the present invention. As shown, a high voltage pad HV is located in the center of the high voltage resistors arranged in a spiral shape, which avoids sharp corners and allows for more even electrical potential gradient along the high voltage resistors. Contacts Va and Vb allow electrical connections to the resistor. In a specific embodiment Va and Vb can correspond to nodes Va and Vb of FIG. 2, respectively. Depending on the application, the on-chip high voltage resistors can be implemented by high sheet resistance poly silicon or thin film metal deposited on a dedicated thick field oxide.

Figure 4:
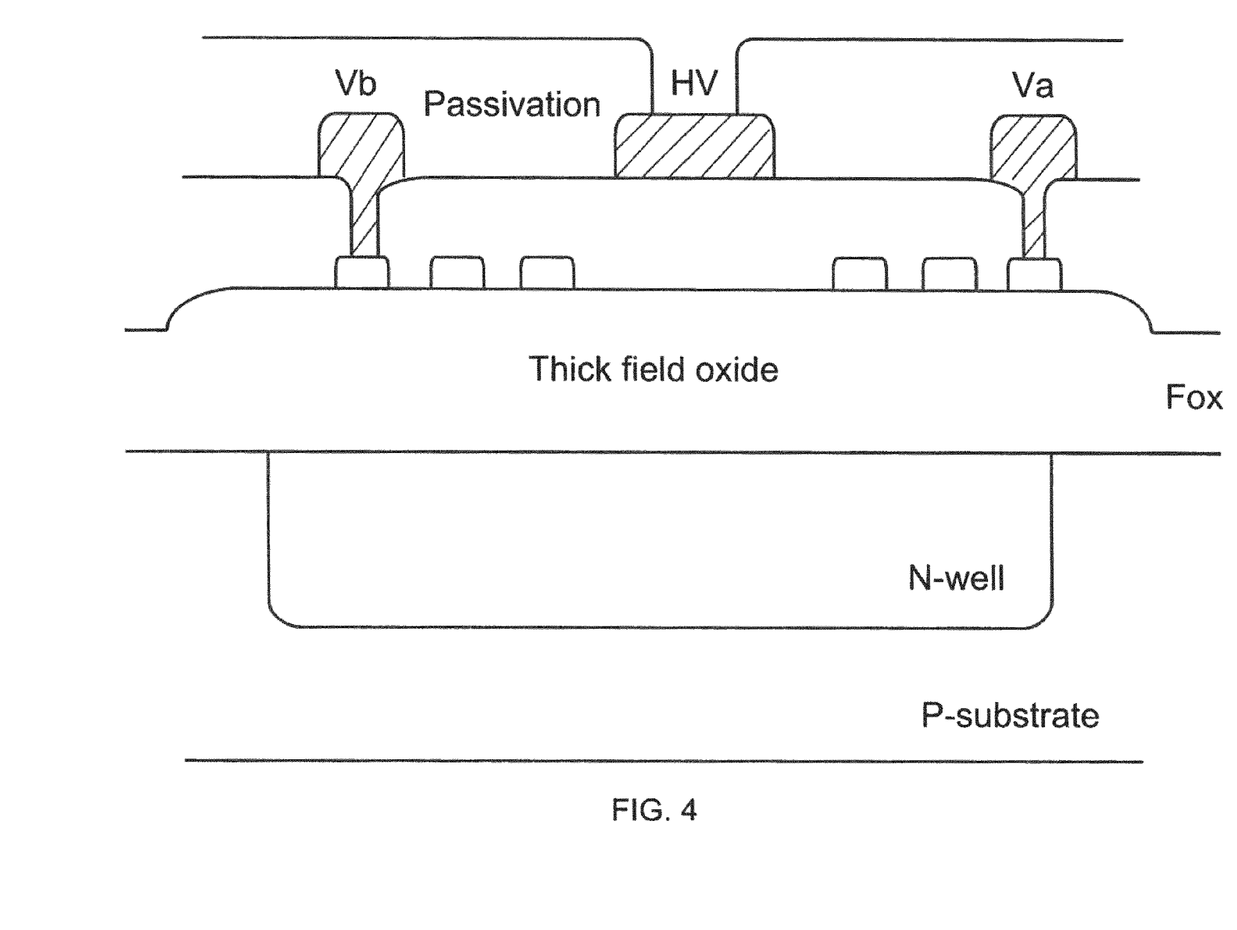
FIG. 4 is a simplified cross-sectional view of the on-chip high voltage resistors of FIG. 3 according to an embodiment of the present invention.

FIG. 4 is a simplified cross sectional view of the on-chip high voltage resistors of FIG. 3 according to an embodiment of the present invention. The high sheet resistance poly resistors reside on a dedicated thick field oxide. In a specific embodiment, control chip 82 is formed using a P-type substrate, and an N-type well is formed in the P-type substrate and under the high voltage resistors as shown in FIG. 4. The N-type well can attenuate noise injection to the substrate. It can be seen that the process for forming high voltage resistors can be substantially simpler and less expensive than a process for high voltage transistors. In embodiments of the invention, the high voltage transistor is formed in a separate high voltage chip. As a result, the cost of the controller chip and the overall power supply can be reduced.

In a specific embodiment, the resistor is formed in polysilicon and has a resistance of approximately 10 Mohm. In this example, the thick field oxide has a thickness of about 1 μm, whereas the standard field oxide has a thickness of about 0.65 μm. The thickness of the polysilicon high voltage resistors is in a range of about 0.1 μm to about 0.5 μm. The spacing between the polysilicon resistors is about 2 to 3 μm. Of course, there can be other variations, modifications, and alternatives.

Figure 5:
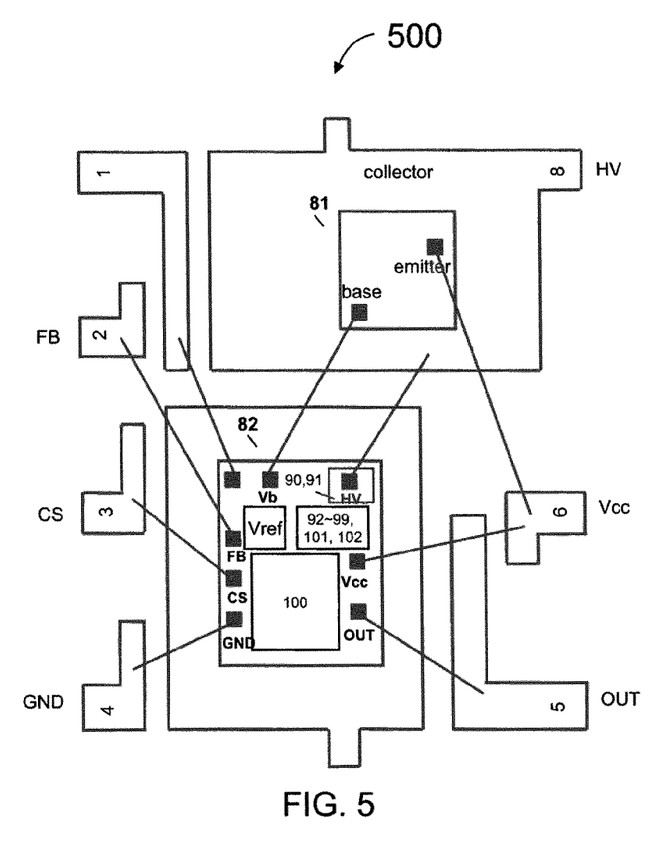
FIG. 5 is a simplified bonding diagram for a power supply controller in a dual-chip package according to an embodiment of the present invention.

FIG. 5 is a simplified top view diagram showing a bonding arrangement of a switching mode power supply controller 500 according to another embodiment of the present invention. In the example of FIG. 5, controller 500 is similar to the switching mode power supply controller 63 of FIG. 2. As shown, high voltage startup transistor chip 81 and control chip 82 are arranged in a dual-chip package. Referring to FIGS. 2 and 5, the pin allocation for the 8-pin package is as follows.

Pin 1—Reserved;
Pin 2—FB for receiving a feedback signal from the power supply;
Pin 3—CS for sensing a current in the primary winding of the transformer;
Pin 4—GND for connection to the ground;
Pin 5—OUT for outputting control pulse signals for controlling the power supply;
Pin 6—Vcc for providing operating power to the SMPS controller;
Pin 7—Reserved;
Pin 8—HV for connection to an external power input, such as a rectified line voltage.

As shown in FIG. 5, in high voltage startup transistor chip 81, the collector is connected through Pin 8 (HV) to the external power input. The emitter is connected to the Vcc pin to provide power to the SMPS controller. The base is connected to the Vb node of control chip 82. In control chip 82, block 100 is the PWM/PFM control circuit and block 92~99, 101, 102 is the startup control circuit as depicted above in FIG. 2. Additionally, block 90,91 are the high voltage resistors, and block Vref provides the reference voltage as described in FIG. 2.

In FIG. 5, a node Vb of control chip 82 is connected to the base pad of high voltage startup transistor 81 by an internal bonding wire. No additional external pin is necessary because of the on-chip high voltage resistors in control chip 82, which simplifies SMPS system design and reduces bill of materials (BOM) cost.

Figure 6:
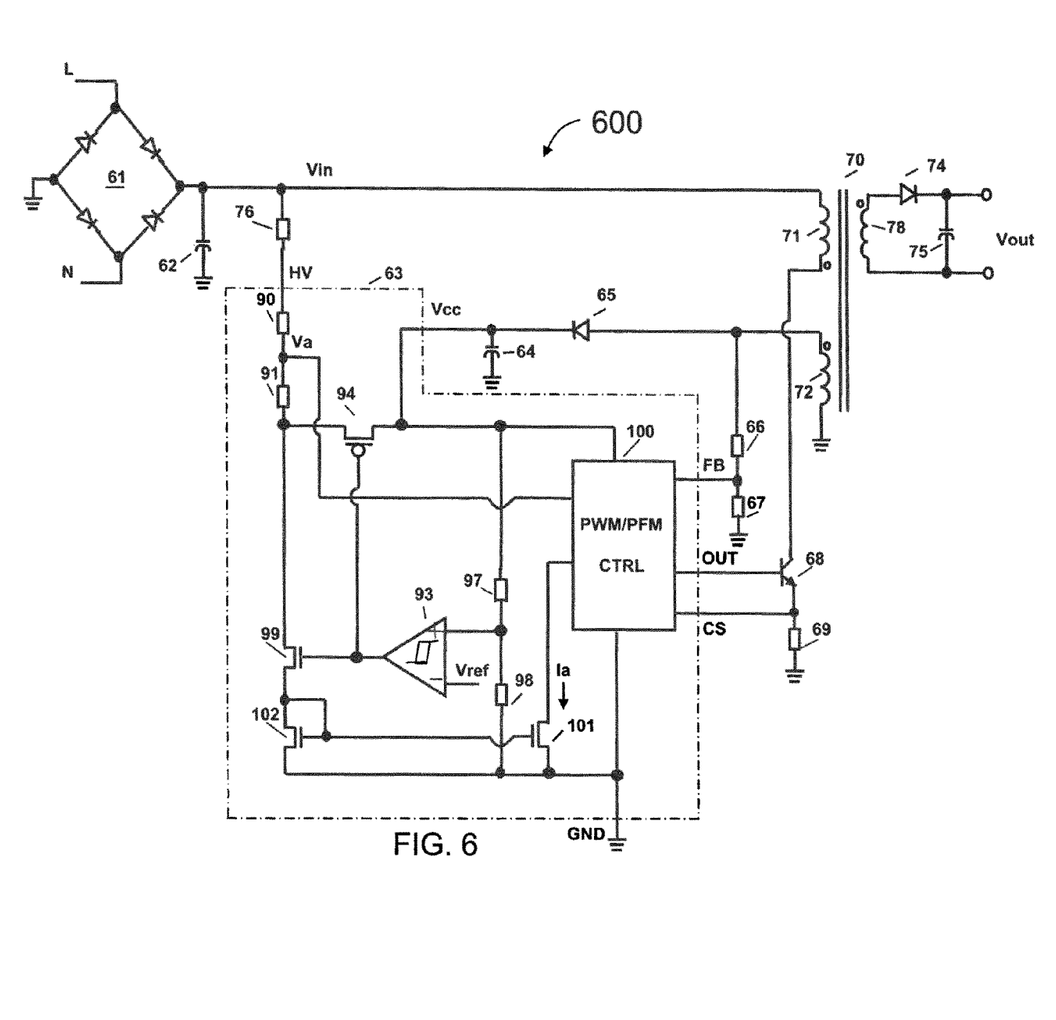
FIG. 6 is a schematic diagram of a switching mode power supply according to another embodiment of the present invention.

In applications in which longer startup times can be accepted, a controller can be implemented without the high voltage startup transistor. FIG. 6 illustrates a simplified circuit diagram of a switching mode power supply 600 according to an alternative embodiment of the present invention. As can be seen in FIG. 6, power supply 600 has a power supply controller 63 which includes similar components as controller 63 in power supply 200 of FIG. 2, with corresponding components identified with the same reference numerals. In FIG. 6, the high voltage startup transistor and associated circuitry is removed from SMPS controller 63 for further cost reduction. In FIG. 6, on-chip high voltage resistors 90 and 91 are used to provide a charging current for Vcc capacitor 64 during startup. Resistors 90 and 91 are also used to generate signals Ia and Va, which can be used for sensing variations in power source Vin for system protection and compensation. PMOS transistor 94 and NMOS transistor 99 act as switches, which are used to control a current flow in high voltage resistors 90 and 91. The current is directed to Vcc charging capacitor 64 through transistor 94 in the startup phase, and to transistor 102 after startup. Here, a low-voltage transistor 94 can be used, because it is coupled to a low-voltage end of resistor 91. Therefore, a lower-cost integrated circuit controller chip 63 can be manufactured without complicated processes for high-voltage transistors. On the other hand, longer startup times can be expected, because the charging current for capacitor 64 is limited by resistors 91 and 92.

Figure 7:
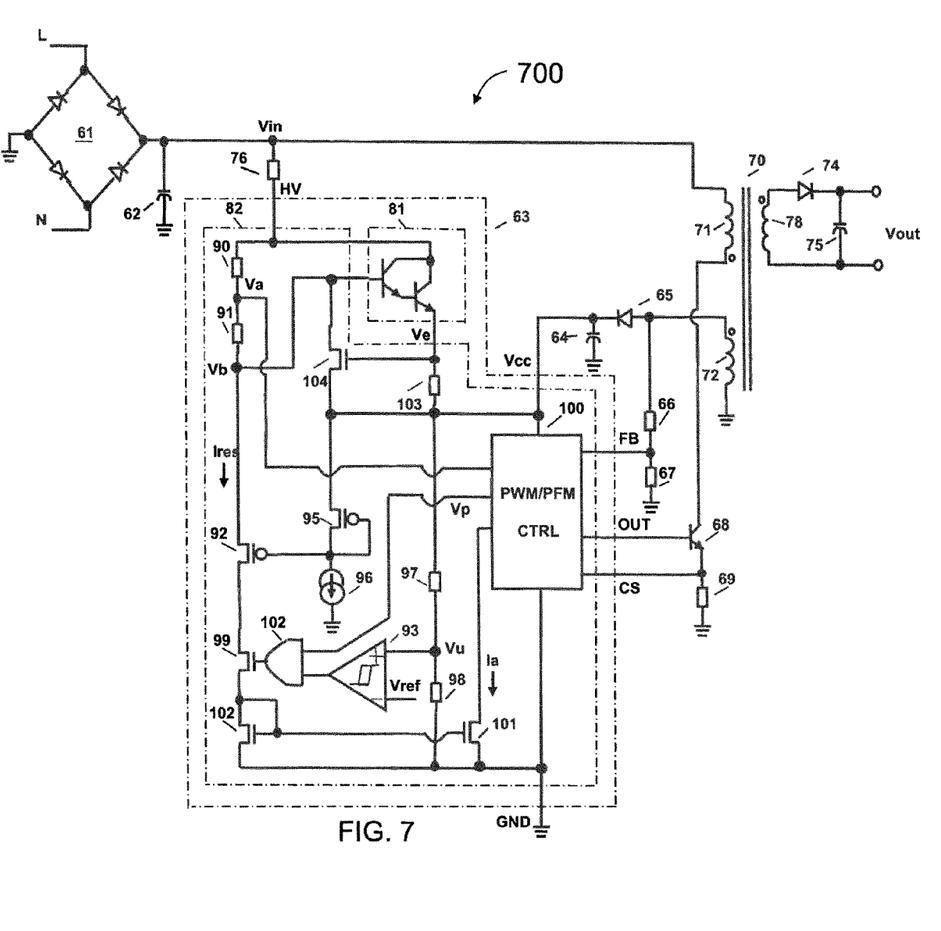
FIG. 7 is a schematic diagram of a switching mode power supply according to still another embodiment of the present invention.

In applications in which low standby power and fast startup are desired at the same time, a controller can be implemented with larger on-chip high voltage resistors and Darlington connected high voltage bipolar transistors to further reduce the current through the on-chip high voltage resistors and generate larger charging current during system startup. Because the current gain of Darlington connected transistors is the multiplication of the current gain of the individual transistors, a charging current limit function is included when Darlington connected high voltage startup transistors are used in the embodiments of the present invention. FIG. 7 illustrates a simplified circuit diagram of a switching mode power supply 700 according to an alternative embodiment of the present invention. As can be seen in FIG. 7, power supply 700 has a power supply controller 63 which includes similar components as controller 63 in power supply 200 of FIG. 2, with corresponding components identified with the same reference numerals. In FIG. 7, high voltage startup chip 81 includes two Darlington connected high voltage bipolar transistors. The equivalent emitter Ve of the Darlington connected startup transistor is connected to the gate of current limit NMOS transistor 104 and one terminal of current sense resistor 103. The drain of NMOS transistor 104 is connected to the equivalent base of the high voltage startup transistor. The source and the other terminal of resistor 103 are connected to the power supply pin Vcc of controller 63. When the voltage drop across resistor 103 exceeds the threshold voltage of 104 in startup phase, the base current of Darlington connected startup transistors is reduced, thus limits the charging current to Vcc capacitor in startup phase.

Figure 8:
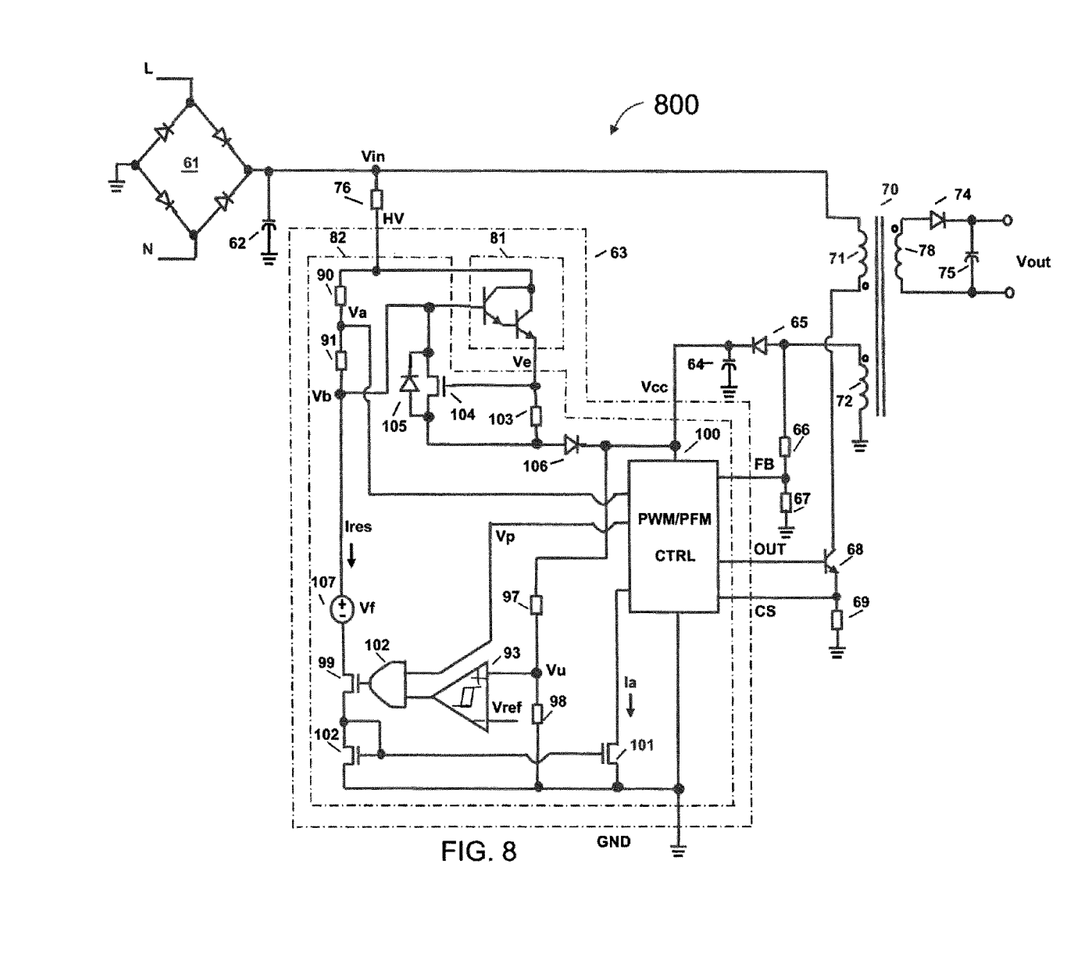
FIG. 8 is a schematic diagram of a switching mode power supply according to still another embodiment of the present invention.

FIG. 8 illustrates another simplified circuit diagram of a switching mode power supply 800 according to an alternative embodiment of the present invention. Power supply 800 has a controller 63 which includes similar components as controller 63 in power supply 200 of FIG. 2, with corresponding components identified with the same reference numerals. In FIG. 8, high voltage startup chip 81 is composed by two Darlington connected high voltage bipolar transistors. The equivalent emitter Ve of the Darlington startup transistor is connected to the gate of current limit NMOS transistor 104 and one terminal of current sense resistor 103. The drain of NMOS transistor 104 is connected to the equivalent base of the high voltage Darlington startup transistor. The source and the other terminal of resistor 103 are connected to the anode of rectifying diode 106, where the cathode of 106 is connected to power supply pin Vcc of controller 63. When the voltage drop across resistor 103 exceeds the threshold voltage of 104 in startup phase, the base current of Darlington connected startup transistors is reduced, thus limits the charging current to Vcc capacitor in startup phase. During normal operation, switch 99 is turned on, Vb=Vf+Vthn, where Vf is a fixed voltage source and Vthn is the threshold voltage of NMOS transistor 99. Since Vf is designed to be smaller than the minimum operating voltage of Vcc, diode 106 is reverse biased when controller 63 is in normal operation. Diode 105 provides a current path from node Ve to Vb if Ve is higher than Vb for 0.7V to prevent the possible reverse breakdown of the base-emitter junctions of Darlington transistor.

Figure 9:
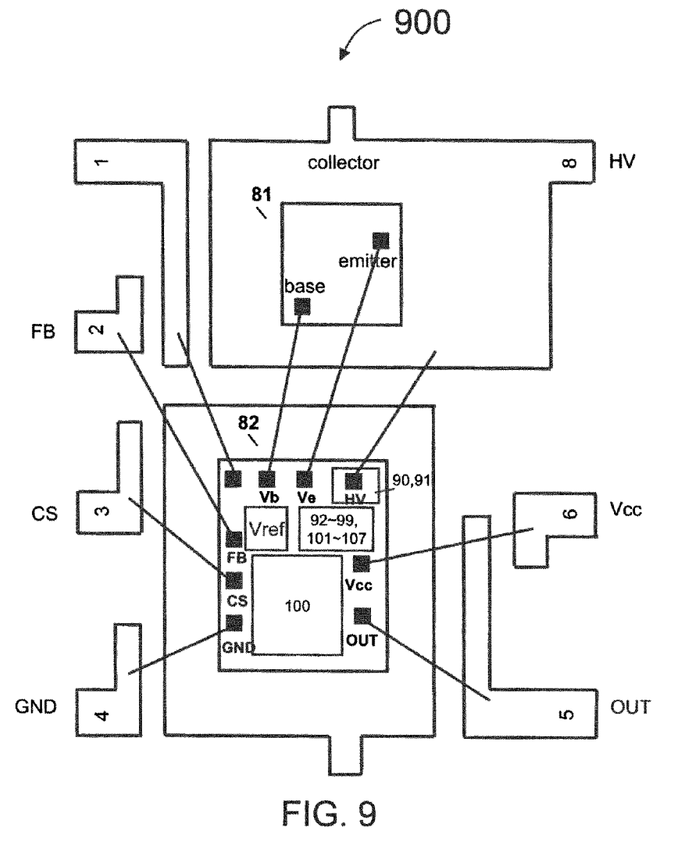
FIG. 9 is a simplified bonding diagram for a power supply controller in a dual-chip package according to the embodiments of the present invention in FIG. 7 and FIG. 8.

FIG. 9 is a simplified top view diagram showing a bonding arrangement of a switching mode power supply controller 900 according to the embodiments of FIG. 7 and FIG. 8 of the present invention. As shown, high voltage Darlington startup transistor chip 81 and control chip 82 are arranged in a dual-chip package with same pin arrangement of FIG. 5.

As shown in FIG. 9, in high voltage Darlington startup transistor chip 81, the collector is connected through Pin 8 (HV) to the external power input. The emitter is connected to the Ve pad of the SMPS controller 82. The base is connected to the Vb pad of control chip 82. In control chip 82, block 100 is the PWM/PFM control circuit and block 92~99, 101~107 is the startup control circuit as depicted above in FIG. 7 and FIG. 8. Additionally, block 90, 91 are the high voltage resistors, and block Vref provides the reference voltage.

In FIG. 9, node Vb of control chip 82 is connected to the base pad of Darlington high voltage startup transistor 81 by an internal bonding wire. The node Ve is connected to the emitter pad of Darlington high voltage startup transistor 81 by another internal bonding wire. No additional external pin is necessary because of the on-chip high voltage resistors in control chip 82, which simplifies SMPS system design and reduces bill of materials (BOM) cost.

While the embodiments and advantages of the present invention have been depicted and described, it will be understood by those skilled in the art that many changes in construction and differing embodiments and applications of the invention will suggest themselves without departing from the spirit and scope of the invention. Thus, the disclosures and descriptions herein are purely illustrative and are not intended to be in any sense limiting.

What is claimed is:

1. A controller for a switching mode power supply, comprising:
    a first semiconductor chip including a high-voltage startup transistor configured for coupling between a high-voltage supply input terminal and a capacitor and configured to provide a charging current to the capacitor in a startup phase or protection mode of a switching mode power supply (SMPS) and to provide substantially no current in a normal operation phase of the SMPS; and
    a second semiconductor chip including a control circuit for controlling the switching mode power supply, the second semiconductor chip also including first and second on-chip high-voltage resistors coupled to the high-voltage supply input terminal and the high-voltage startup transistor in the first semiconductor chip, wherein the control circuit is configured to monitor a high voltage supply at the high-voltage supply input terminal using a voltage and a current provided by the first and the second on-chip high-voltage resistors.

2. The controller of claim 1 wherein the control circuit is configured to provide a pulse width modulated (PWM) control signal to control the switching mode power supply.

3. The controller of claim 1 wherein the control circuit is configured to provide a pulse frequency modulated (PFM) to control the switching mode power supply.

4. The controller of claim 1 wherein the second semiconductor chip further comprising:
    a high-voltage terminal for coupling to an input voltage;
    a feedback terminal coupled to an auxiliary winding or an opto-coupler of the SMPS for sensing the output voltage;
    an input power supply terminal for coupling to the auxiliary winding of the SMPS for receiving operating power supply; and
    wherein the control circuit is coupled to the feedback terminal and an off-chip power transistor.

5. The controller of claim 1 wherein a current through the on-chip high-voltage resistors is used for sensing the high-voltage supply input.

6. The controller of claim 1 wherein a voltage at a node between the first and the second on-chip high-voltage resistors is used for sensing the high-voltage supply input.

7. The controller of claim 1 wherein the on-chip high-voltage resistors reside over a dedicated thick field oxide so as to avoid breakdown of an insulator between the high voltage resistors and a substrate of the second semiconductor chip.

8. The controller of claim 7 further comprises a doped well beneath the dedicated thick field oxide to attenuate noise injection into the substrate from the high voltage resistors.

9. The controller of claim 7 wherein each of the on-chip high-voltage resistors is shaped in a spiral surrounding a high voltage pad for reducing voltage gradients along the resistors.

10. The controller of claim 1 wherein the high-voltage startup transistor comprises a bipolar transistor or Darlington connected bipolar transistors having a collector, a base, and an emitter, wherein:
    the collector is coupled to a rectified line voltage;
    the emitter is coupled to a power supply pin Vcc of the SMPS controller; and
    the base is coupled to the collector through one or more high voltage resistors on the control chip, the base being also coupled to a ground potential through a startup control circuit of the control chip.

11. The controller of claim 10 wherein a current through the on-chip high-voltage resistors is configured to flow into the base of the high voltage startup transistor for providing power to the controller in a startup phase or protection mode of the SMPS.

12. The controller of claim 10 wherein the startup control circuit comprises a biasing device connected in series with a switch and a current mirror, the biasing device being configured to maintain the startup transistor in an off state when the switch is in on state, and the current mirror being configured to sense the current through the high voltage resistors.

13. The controller of claim 12 wherein:
the switch comprises an NMOS transistor having a gate configured to receive the signal from an under voltage lockout comparator and the protection mode signal of the SMPS controller;
the biasing device comprises a source-follower-connected PMOS transistor that has a source connected to one terminal of the on-chip high voltage resistors and the base of the high voltage startup transistor; and
the biasing device further comprises one or more diode-connected PMOS transistors in series with a current source coupled between the Vcc and the ground potential, a gate of the source-follower-connected PMOS transistor being coupled to the diode-connected PMOS transistors such that the base voltage of the high voltage startup transistor is less than or equal to the emitter voltage of the high voltage startup transistor when the system is in normal operation mode.

14. The switching mode power supply controller of claim 12 wherein the switch is configured to receive an under voltage lockout control signal and a protection mode control signal of the SMPS controller, the switch is turned off when the SMPS is in startup phase or protection mode, whereas the switch is turned on when the SMPS is in normal operation mode.

15. The switching mode power supply controller of claim 1 wherein the first semiconductor chip and the second semiconductor chip are included in a single dual-chip package.

16. A switching mode power supply for receiving an input voltage and providing a DC output voltage, the power supply comprising:
a transformer coupled to the input voltage, the transformer including a primary winding, a secondary winding, and one or more auxiliary windings;
a switching mode power supply (SMPS) controller having a feedback terminal for sensing the output voltage and an input power supply terminal for coupling to an auxiliary winding of the transformer, the SMPS controller including:
a first semiconductor chip including a high-voltage startup transistor configured for coupling between a high-voltage supply input terminal and a capacitor and configured to provide a charging current to the capacitor in a startup phase or protection mode of the SMPS and to provide substantially no current in a normal operation phase of the SMPS; and
a second semiconductor chip having:
a high-voltage terminal for coupling to the input voltage;
a feedback terminal coupled to an auxiliary winding or an opto-coupler for sensing the output voltage;
an input power supply terminal for coupling to an auxiliary winding of the transformer for receiving operating power supply;
a first and a second on-chip high-voltage resistors coupled in series to the input voltage and to the high-voltage startup transistor, and
a control circuit coupled to the feedback terminal and an off-chip power transistor,
wherein a node between the first and the second high-voltage resistors is used for sensing the input voltage.

17. The power supply of claim 16 wherein the first and the second on-chip high-voltage resistors are configured to provide a voltage and a current for sensing the high-voltage supply input.

18. The power supply of claim 16 wherein the on-chip high-voltage resistors reside over a dedicated thick field oxide so as to avoid breakdown of the insulator between the high voltage resistors and a substrate of the second integrated circuit chip.

19. The power supply of claim 16 wherein the first semiconductor chip and the second semiconductor chip are included in a single dual-chip package.

20. A switching mode power supply (SMPS) controller comprising:
a high-voltage terminal for coupling to an input voltage;
a feedback terminal coupled to an auxiliary winding or an opto-coupler for sensing the output voltage;
an input power supply terminal for coupling to an auxiliary winding of the transformer for receiving operating power supply;
a first and a second on-chip high-voltage resistors coupled in series to the input voltage, wherein a node between the first and the second high-voltage resistors is adapted for sensing the input voltage, wherein each of the on-chip high-voltage resistor is shaped in a spiral surrounding a high voltage pad for reducing voltage gradients along the resistors; and
a low-voltage transistor coupled to the second high-voltage resistor and the input power supply terminal for providing startup power to the SMPS controller.

21. The controller of claim 20 wherein the first and the second on-chip high-voltage resistors is used to provide a voltage and a current for sensing the high-voltage supply input.

22. The controller of claim 20 wherein the on-chip high-voltage resistors reside over a dedicated thick field oxide so as to avoid breakdown of the insulator between the high voltage resistors and a substrate of the second integrated circuit chip.

23. A switching mode power supply for receiving an input voltage and providing a DC output voltage, the power supply comprising:
a transformer coupled to the input voltage, the transformer including a primary winding, a secondary winding, and one or more auxiliary windings;
a switching-mode power supply (SMPS) controller having a feedback terminal for sensing the output voltage and an input power supply terminal for coupling to an auxiliary winding of the transformer, the SMPS controller including a first and a second on-chip high-voltage resistors coupled in series to the input voltage, wherein each of the on-chip high-voltage resistor is shaped in a spiral surrounding a high voltage pad for reducing voltage gradients along the resistors; and
a low-voltage transistor coupled to the high-voltage resistors and the input power supply terminal for providing startup power to the SMPS controller,
wherein a node between the first and the second high-voltage resistors is adapted for sensing the input voltage.

24. The power supply of claim 23 wherein the first and the second on-chip high-voltage resistors are configured to provide a voltage and a current for sensing the high-voltage supply input.

25. The power supply of claim 23 wherein the on-chip high-voltage resistors reside over a dedicated thick field oxide so as to avoid breakdown of the insulator between the high voltage resistors and a substrate of the integrated circuit chip.

26. A switching mode power supply for receiving an input voltage and providing a DC output voltage, the power supply comprising:
  a transformer coupled to the input voltage, the transformer including a primary winding, a secondary winding, and one or more auxiliary windings;
  a switching mode power supply (SMPS) controller having a feedback terminal for sensing the output voltage and an input power supply terminal for coupling to an auxiliary winding of the transformer, the SMPS controller including:
    a first semiconductor chip including Darlington connected high-voltage startup transistors configured for coupling between a high-voltage supply input terminal and a capacitor and configured to provide a charging current to the capacitor in a startup phase or protection mode of the SMPS and to provide substantially no current in a normal operation phase of the SMPS; and
    a second semiconductor chip having:
      a high-voltage terminal for coupling to the input voltage;
      a feedback terminal coupled to an auxiliary winding or an opto-coupler for sensing the output voltage;
      an input power supply terminal for coupling to an auxiliary winding of the transformer for receiving operating power supply;
      a first and a second on-chip high-voltage resistors coupled in series to the input voltage and to the Darlington connected high-voltage startup transistors;
      a circuit to limit the charging current when the system is in startup phase or protection mode, and
      a control circuit coupled to the feedback terminal and an off-chip power transistor,
    wherein a node between the first and the second high-voltage resistors is used for sensing the input voltage.

27. The controller of claim 26 wherein the charging current limit circuit comprises a base current bypassing transistor to reduce the base current into the Darlington high voltage startup transistor when the voltage drop across an emitter current sense resistor exceeds the turn on threshold voltage of the base current bypassing transistor.

28. The controller of claim 26 wherein the startup control circuit comprises a biasing device connected in series with a switch and a current mirror, the biasing device being configured to maintain a constant voltage for the base of the Darlington startup transistor, the constant base voltage being smaller than the minimum operating voltage of the controller when the system is in normal operation mode so as to reverse bias the diode inserted between one terminal of the emitter current sense resistor and the power supply pin of the controller.

29. The power supply of claim 26 wherein the first and the second on-chip high-voltage resistors are configured to provide a voltage and a current for sensing the high-voltage supply input.

30. The power supply of claim 26 wherein the on-chip high-voltage resistors reside over a dedicated thick field oxide so as to avoid breakdown of the insulator between the high voltage resistors and a substrate of the second integrated circuit chip.

31. The power supply of claim 26 wherein the first semiconductor chip and the second semiconductor chip are included in a single dual-chip package.

* * * * *